No. 767,196. PATENTED AUG. 9, 1904.
C. L. ALLEN.
COLLAR STUFFING MACHINE.
APPLICATION FILED NOV. 26, 1902.
NO MODEL. 2 SHEETS—SHEET 1.
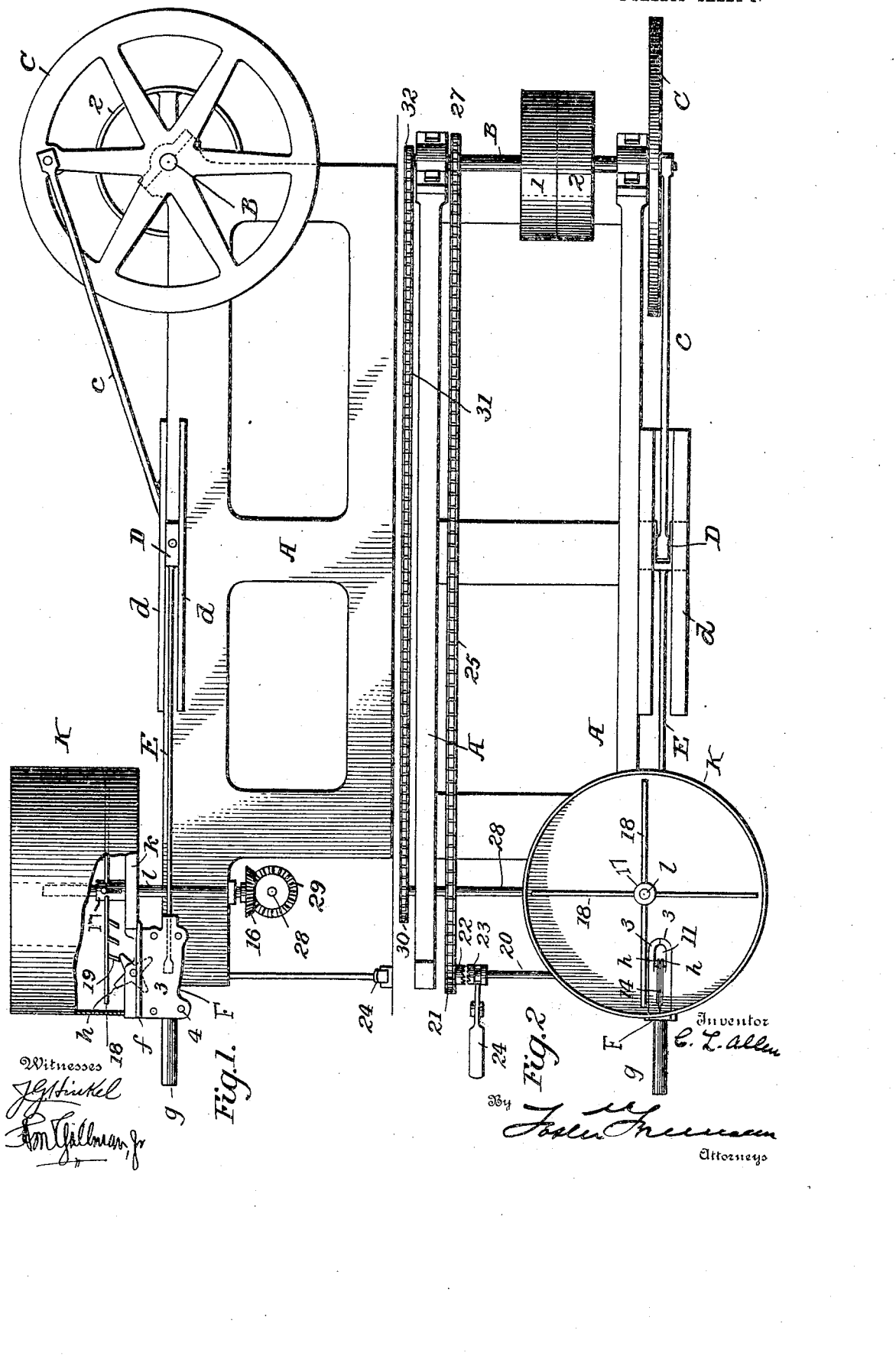

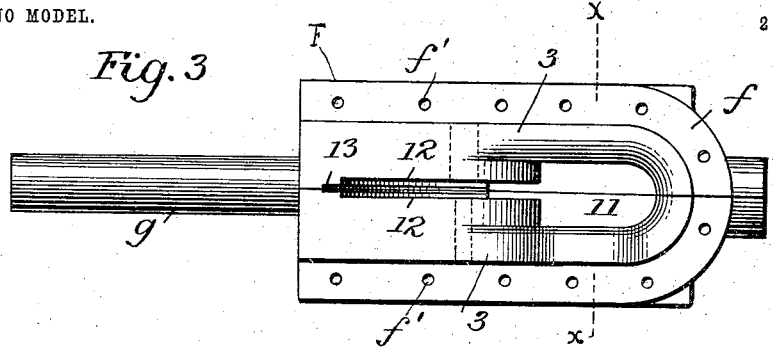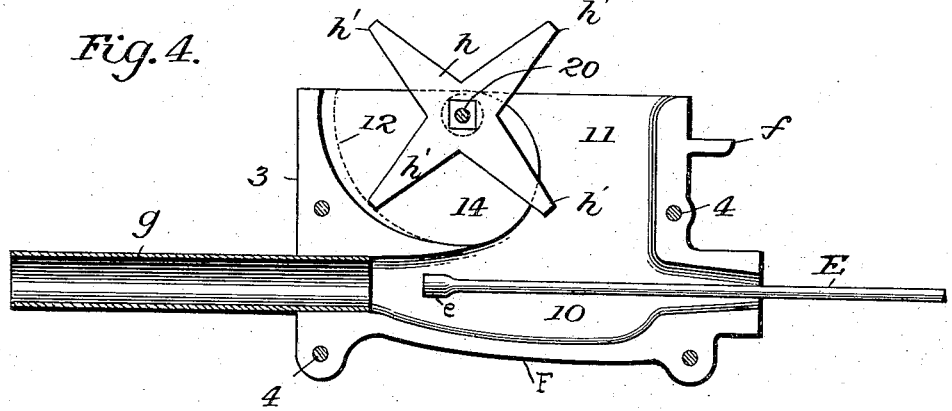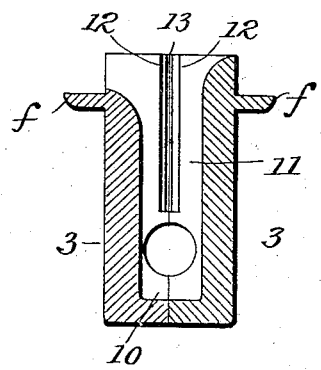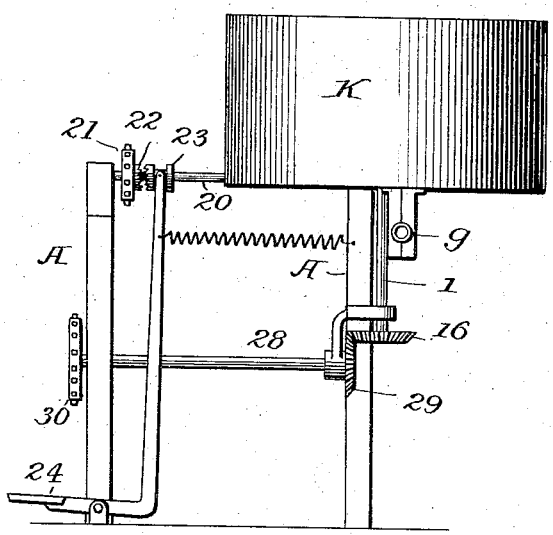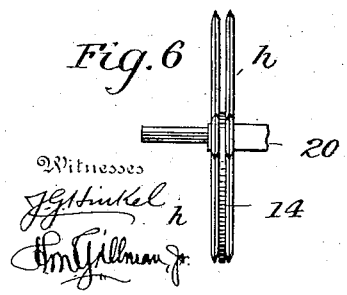

No. 767,196.

Patented August 9, 1904.

UNITED STATES PATENT OFFICE.

CLARENCE L. ALLEN, OF ATLANTA, GEORGIA, ASSIGNOR TO COTTON COLLAR COMPANY, OF ATLANTA, GEORGIA, A CORPORATION OF GEORGIA.

COLLAR-STUFFING MACHINE.

SPECIFICATION forming part of Letters Patent No. 767,196, dated August 9, 1904.

Application filed November 26, 1902. Serial No. 132,963. (No model.)

*To all whom it may concern:*

Be it known that I, CLARENCE L. ALLEN, a citizen of the United States, residing at Atlanta, in the county of Fulton and State of Georgia, have invented certain new and useful Improvements in Collar-Stuffing Machines, of which the following is a specification.

This invention relates to machines for stuffing horse-collars; and the object of the invention is to improve the construction and general mode of operation of machines for this purpose.

The invention will be fully described hereinafter, reference being had to the accompanying drawings, in which—

Figure 1 is a side elevation, partly broken away, of a machine embodying my invention. Fig. 2 is a plan view. Fig. 3 is a plan view, on enlarged scale, of the feed-box. Fig. 4 is a longitudinal section. Fig. 5 is a transverse section on the line $xx$, Fig. 3. Fig. 6 is an edge view of the feed-saws and stuffing-plate. Fig. 7 is an end view of the machine.

While this invention is designed more particularly for stuffing horse-collars, it may of course be used for stuffing other articles, its form and shape being varied, if necessary, to adapt it to the particular work intended. It is designed to operate in connection with various material—such as hair, moss, cotton, wool-flock, straw, and the like; but I shall herein describe it in connection with the use of cotton.

There is a suitable supporting-frame (indicated as a whole by A) at one end of which a main driving-shaft B is supported in bearings $b$, said shaft having thereon a fast and a loose pulley 1 and 2, over which a driving-belt (not shown) will run in the usual manner. To one end of the shaft B a crank-wheel C is secured, and a rod $c$ connects the wheel to a head D, supported to slide in guideways $d$ on the side of the frame A, and a stuffing-rod E is connected at one end to the said head.

The feed-box into which the stuffing material is fed and from which it is pushed by the stuffing-rod into the collar or other article to be stuffed is indicated by F, and while it may be formed in various ways and of various shapes I preferably make it of two castings 3 3, which may be connected together by any suitable means, as bolts 4. These castings will be so formed that when connected together there will be a feed-chamber 10 formed in the lower portion within which the stuffing-rod E will reciprocate in order to push the material through a tube $g$, leading from the chamber and over which the article to be stuffed may be placed. The top of the feed-box is closed except for a passage 11, leading to the feed-chamber 10, a slot 12, through which feed-saws $h\ h$, to be hereinafter described, work, and a narrower slot 13 for the reception of a stripping-plate 14, located between the saws. Preferably there will be a lateral flange $f$ near the upper end of the feed-box, and, as shown, the bottom $k$ of a feed-hopper K is cut out to fit over the top of the feed-box and rest upon the flange $f$, and the latter is provided with a series of openings $f'$ for the passage of bolts or screws by means of which the feed-box may be firmly secured to the bottom of the hopper, and the hopper may be supported upon the frame A and secured in position in any desired manner and serve as a support for the feed-box, or the latter may be secured to the frame in any desired manner and serve as a support for the hopper. The hopper K is preferably cylindrical, and a shaft $l$ extends vertically through the bottom and is supported in suitable bearings on the frame and provided at its lower end with a bevel-gear 16. Within the hopper a collar 17 is adjustably secured upon the shaft $l$ and carries a series of horizontally-disposed arms 18 each having a series of teeth 19, by means of which when the shaft $l$ is rotated the stuffing material will be moved over the mouth of the passage 11 in position to be carried by the saws $h\ h$ down the passage to the feed-chamber 10. By having the arms 18 vertically adjustable the amount of the stuffing material moved over the mouth of the passage 11 may be regulated. There are two of these saws illustrated and they are fixed to a shaft 20, supported in bearings upon the frame A and extending through the feed-box. The stripping-plate 14 is located between the saws, fits loosely over the shaft 20, and extends into the slot 13, which is formed by recesses in the two castings 3, and when they are bolted together the plate 14 will be clamped between them. Any greater number of saws and stripping-plates may be employed, and the stripping-plate may be otherwise secured in position, it being only necessary that it shall be securely held against movement. As shown, each saw has four tapering teeth $h'$; but obviously the saws might have more or less teeth and of a different form. In practice, however, the form shown has proved very efficient. The stripping-plate is so shaped that a portion of its edge is eccentric to the shaft 20 and the teeth of the saws will project beyond it while moving down the passage 11, but will not project beyond it after reaching the lower end of the passage. This insures that the stuffing material will be carried by the saws down the passage 11 into the feed-chamber 10 when the plate 14 and the sides of the slot 12 will coöperate to strip the material off the saws, so that it will remain in the feed-chamber 10 until pushed out by the stuffing-rod E.

In order to rotate the shaft 20, I preferably mount a sprocket-wheel 21 loosely on the shaft 20 and provide it with a clutch member 22. On the shaft 20 I provide another clutch member 23, keyed to the shaft and slidable thereon, and a foot-operated mechanism (indicated as a whole by 24) is connected to the clutch member 23 to engage and disengage the latter with the clutch member 22. A chain 25 connects the sprocket-wheel 21 with a sprocket-wheel 26, fast on the main driving-shaft B. My reason for using a clutch mechanism on the shaft 20 is to enable the operator to control the feed of the stuffing material to the feed-chamber without stopping the machine.

In order to rotate the vertical shaft $l$, a shaft 28, supported in suitable bearings on the frame A, is provided with a bevel-gear 29, which meshes with the bevel-gear 16 on the shaft $l$. The shaft 28 is also provided with a sprocket-wheel 30, which is connected by a chain 31 to a sprocket-wheel 32 on the driving-shaft B.

As before stated, I prefer to use sprocket-wheels and chains for driving the devices which feed the stuffing material to the feed-chamber, and this is mainly for the reason that sometimes the stuffing material offers such resistance to the feeding devices as would be sufficient to cause slippage between a belt and pulley; but while I prefer such driving devices I am not to be understood as restricting myself to their use only, for other forms of devices for transmitting power from the main driving-shaft to the feeding devices may be equally effective.

The stuffing-rod E is provided with a head $e$, which gradually increases in size from the rod to its front face, so that no square shoulder is presented to pull the stuffing material toward the rear of the feed-box when the stuffing-rod moves backward. Usually the feed-chamber will be full of the stuffing material, and the head on account of its tapering shape will move freely through the material when the rod is moving backward.

Without limiting myself to the precise details of construction shown and described, I claim—

1. In a machine for stuffing collars, &c., the combination of a hopper for the stuffing material having an opening in its bottom, a feed-box detachably connected to the hopper and having a feed-chamber and a vertical passage leading from said chamber and communicating with said opening in the hopper, horizontally-disposed rotary toothed arms within said hopper for moving the material in the hopper to said passage, means for adjusting said arms vertically, rotary saws for carrying the material from the hopper through said passage to the feed-chamber, means for stripping the material from the saws at the junction of said passage and feed-chamber, a reciprocating stuffing-rod for moving the stripped-off material out of the chamber, and means for stopping the rotation of the saws without stopping the rod, substantially as set forth.

2. In a machine for stuffing collars, &c., the combination of a feed-chamber, a horizontally-disposed tube leading from the chamber, a stuffing-rod, means for reciprocating the rod in the feed-chamber and tube, a hopper for the stuffing material to the bottom of which the feed-box is detachably connected, said box having a passage substantially perpendicular to and leading from said feed-chamber and communicating with an opening in the bottom of the hopper, horizontally-disposed rotary toothed arms within the hopper for moving the stuffing material over the said opening, means for adjusting said arms vertically, rotary saws for carrying the material down said passage from the hopper to the feed-chamber, and means for stripping the material from the saws at the junction of the passage and feed-chamber, substantially as set forth.

In testimony whereof I have signed my name to this specification in the presence of two subscribing witnesses.

CLARENCE L. ALLEN.

Witnesses:
J. J. EAGAN,
A. B. LOVETT.